United States Patent

[11] 3,602,122

[72] Inventor Gunter Fauth
  Unterhaching, Munich, Germany
[21] Appl. No. 782,840
[22] Filed Dec. 11, 1968
[45] Patented Aug. 31, 1971
[73] Assignee Agfa-Gevaert Aktiengesellschaft
  Leverkusen, Germany
[32] Priority Dec. 22, 1967
[33] Germany
[31] P 15 97 099.7

[54] SHUTTER FOR PHOTOGRAPHIC APPARATUS
  20 Claims, 5 Drawing Figs.
[52] U.S. Cl. .................................................. 95/59
[51] Int. Cl. .................................................. G03b 9/10
[50] Field of Search ...................................... 95/53, 58,
  59, 60, 62; 352/208, 209, 210

[56] References Cited
  UNITED STATES PATENTS
  433,745  8/1890  Schneider ................... 95/53

| 3,063,354 | 11/1962 | Matulik | 95/10 |
| 3,186,003 | 5/1965 | Gregory | 352/208 |
| 3,303,271 | 2/1967 | Hecker | 352/208 X |

FOREIGN PATENTS

| 244,153 | 12/1965 | Austria | 352/208 |
| 970,410 | 9/1958 | Germany | 352/208 |

*Primary Examiner*—Samuel S. Matthews
*Assistant Examiner*—Monroe H. Hayes
*Attorney*—Michael S. Striker ABSTRACT: A shutter for still cameras wherein two blades define an adjustable movable opening which moves toward, in registry with and beyond a fixed light-transmitting opening when the user makes an exposure. The size of the movable opening is adjusted before this opening moves into registry with the fixed opening so that the selected size of the movable opening remains unchanged while scene light passes through the two openings during that interval when the movable opening registers with the fixed opening.

PATENTED AUG 31 1971

INVENTOR.

GÜNTER FAUTH

BY Michael S. Hunter

Attorney

INVENTOR.
GÜNTER FAUTH 3,602,122

SHUTTER FOR PHOTOGRAPHIC APPARATUS

BACKGROUND OF THE INVENTION

The present invention relates to shutters for photographic apparatus, particularly to improvements in shutters for use in still cameras. Still more particularly, the invention relates to improvements in shutters of the type wherein an opening defined by several shutter blades is movable toward, in registry with and beyond a fixed light-transmitting opening to thereby determine the length of exposure time.

A shutter wherein the blades define an adjustable movable opening which is movable past a fixed light-transmitting opening is disclosed, for example, in Swiss Pat. No. 375,227. A drawback of the patented shutter is that the size of the movable opening is adjusted during release of the shutter, i.e., that the size of the movable opening changes while the blades travel with reference to the fixed light-transmitting opening. Consequently, different zones of the fixed opening transmit scene light for different periods of time which affects the quality of exposures. If the shutter is mounted behind the lens, illumination of different parts of a film frame for different periods of time vignetting.

SUMMARY OF THE INVENTION

One object of my invention is to provide a shutter for photographic apparatus which overcomes the drawbacks of the just outlined conventional shutter and which is designed in such a way that it insures illumination of all zones of a film frame for the same interval of time.

Another object of the invention is to provide a simple, compact and relatively inexpensive shutter which can furnish any desired number of exposure times and which can be used in cameras for operation in daylight as well as in cameras which are provided with or can be combined with means for making exposures in artificial light.

A further object of the invention is to provide a shutter which can be adjusted automatically as a function of scene brightness, as a function of the distance between the camera and the subject, as a function of the condition of a source of artificial light and/or in dependency on other factors.

An additional object of the invention is to provide a shutter which can be combined with a diaphragm in such a way that the aperture size is a function of the selected exposure time or visa versa, at least when the camera is set for automatic operation and/or for operation in daylight.

Still another object of the invention is to provide a shutter which can be built into many types of presently known cameras.

The improved shutter comprises basically a platen or analogous means defining a round or otherwise configurated fixed light-transmitting opening which can admit scene light to an unexposed film frame, a plurality of shutter blade means defining a movable opening and normally overlying the fixed opening to prevent scene light from reaching the film frame, at least one of the blade means being movable with reference to the other blade means to change the size of the movable opening, adjusting means operative to move the one blade means to select a movable opening of desired size, and drive means operative to move the blade means so that the thus adjusted movable opening advances toward, in registry with and beyond the fixed light-transmitting opening whereby the duration of that interval during which the movable opening registers with the fixed opening determines the length of exposure time.

The arrangement is preferably such that the adjusting means is operated automatically in response to actuation of a trigger and that the latter operates or causes operation of the drive means when the operation of the adjusting means is completed so that the size of the adjusted movable opening remains unchanged while the shutter blade means move under the action of the drive means.

The novel features which are considered as characteristic of the invention are set forth in particular in the appended claims. The improved shutter itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
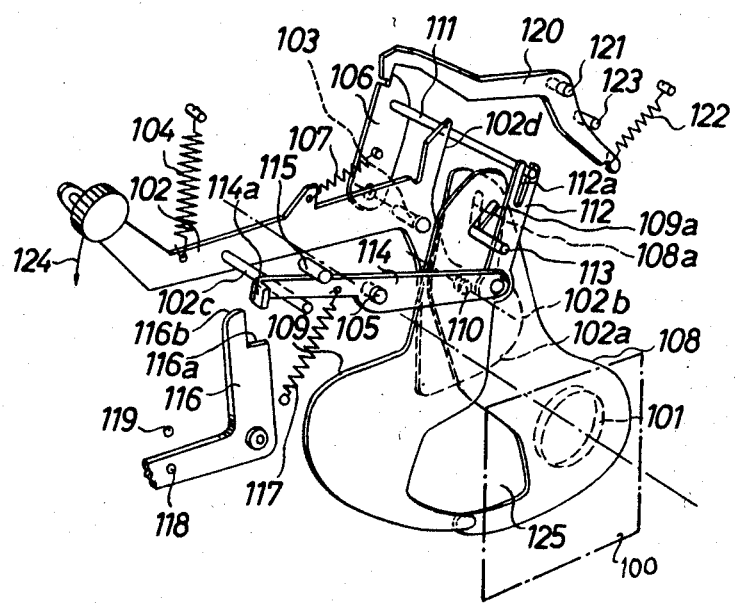
FIG. 1 is a perspective view of a portion of a still camera including a shutter which embodies one form of my invention.

FIG. 1 illustrates a portion of a photographic camera which comprises a plate 100 (indicated by phantom lines) provided with a fixed light-transmitting opening 101. The opening 101 is normally overlapped by a vane or mask 102a constituting one arm of a main driving member or trigger 102. The latter is a lever which is turnable with reference to the camera body on a fixed pivot pin 103 and is biased by a helical return spring 104 so that it tends to turn in a clockwise direction. A helical spring 107 couples the trigger 102 with a driving lever 106 which is also pivotable on the pin 103. The aforementioned vane 102a has a convex edge face 102b. The trigger 102 includes a projection or post 102c and a cocking arm 102d. The shutter further comprises two sectors or blades 108, 109 which are turnable on a common pivot pin 110 and are formed with elongated slots 108a, 109a for a control pin or rocking pin 113. The driving lever 106 is rigid with a rod or post 111 which extends into the open slot 112a of an adjusting link or carrier 112. The latter carries the aforementioned rocking pin 113 for the shutter blades 108, 109. The link or carrier 112 is pivotable on one arm of a two-armed adjusting lever 114 which is turnable on a fixed pivot pin 105. The other are 114a of the lever 114 abuts against the projection 102c of the trigger 102. One end position of the adjusting lever 114 is determined by a fixed abutment or stop 115. This lever is biased by a helical spring 117 which urges its arm 114a against the projection 102c. A selector lever 116 is pivotable about a fixed axis and has several shoulders or stops (two stops 116a, 116b are shown in FIG. 1) each of which can be moved into the path of movement of the arm 114a. Detents 118, 119 are provided to locate the lever 116 in one of several positions in each of which a different shoulder extends into the path of movement of the arm 114a. The selector lever 116 can be rocked automatically to assume a predetermined position in response to attachment or detachment of a flash unit (not shown) from the camera body. This lever 116 is also adjustable by hand so that the operator of the camera can select a desired exposure time.

The structure shown in FIG. 1 further comprises a retaining device 120 which is a two-armed lever turnable on a fixed pivot pin 121 and biased by a helical spring 122 so that it normally bears against a stop 123. One arm of the retaining device 120 serves as a means for holding the driving lever 106 in cocked position during a first stage of movement of the trigger 102 in a counterclockwise direction.

The operation:

If the user of the camera pivots the trigger 102 in the direction indicated by arrow 124, the adjusting lever 114 pivots under the action of the spring 117 which urges its arm 114a against the projection 102c. The adjusting lever 114 is arrested when its arm 114a engages one of the shoulders 116a, 116 b of the selector lever 116, for example, the shoulder 116a. While the adjusting lever 114 turns under the action of the spring 117, its other arm pushes the adjusting link 112 upwardly along the post 111 whereby the rocking pin 113 slides in the slots 108a, 109a and causes the blades 108, 109 to pivot about the axis of the pin 110 and to define a movable opening 125 of a size which is a function of the extent of angular displacement of the adjusting lever 114, i.e., the size of the movable opening 125 depends on the angular position of the selector lever 116. The area of the opening 125 (particularly its dimension as seen in the direction of pivotal movement of shutter blades 108, 109 about the axis of the pin 110) is less if the adjusting lever 114 is arrested by the shoulder 116a and such area is greater if the arm 114a is arrested by the shoulder 116b because the blades 108, 109 of the shutter shown in FIG. 1 are designed to define an opening of maximum size when the adjusting lever 114 abuts against the projection 102c in the illustrated starting or idle position of the trigger 102. If the area of the opening 125 is reduced, the exposure time is shorter because it takes less time to move the opening 125 past the fixed light-transmitting opening 101.

When the trigger 102 pivots in the direction indicated by arrow 124, it moves the vane or mask 102a away form registry with the opening 101 whereby the convex edge 102b of the mask engages the left-hand arm of the retaining device 120 and pivots the latter against the opposition of the spring 122 so that the driving lever 106 is released. This lever is then free to follow the bias of the spring 107 and pivots in a counterclockwise direction whereby its post 111 pivots in the same direction and causes the shutter blades 108, 109 to turn simultaneously about the axis of the pivot pin 110. The spring 107 has stored a substantial amount of energy when the driving lever 106 is released because it expands in response to pivotal movement of the trigger 102 from starting position. Therefore, the blades 108, 109 are rapidly propelled in a counterclockwise direction and move the opening 125 past the fixed opening 101 at a predetermined speed which, combined with the selected size of the opening 125, furnishes an exposure time of desired length. The post 111 pivots the blades 108, 109 by way of the adjusting link 112 and rocking pin 113; however, the distance between the pins 110, 113 is then unchanged so that the size of the opening 125 remains constant while this opening travels past the fixed opening 101.

When the trigger 102 is released, it pivots in a clockwise direction under the action of the return spring 104. The mask 102a returns into registry with the fixed opening 101 so that the shutter is closed. When the opening 101 is already closed (overlapped) by the mask 102a, the cocking arm 102d of the trigger 102 engages the post 111 and the latter pivots the adjusting link 112 in a clockwise direction. The post 111 also turns the driving lever 106 which is thereby reengaged by the retaining device 120. The projection 102c returns the adjusting lever 114 to the illustrated position so that the arm 114a is moved away from the shoulder 116a or 116b and the shutter is ready for the next exposure.

It will be seen that the size of the opening 125 is adjusted prior to movement of shutter blades 108, 109 to uncocked positions, i.e., the size of the opening 125 is adjusted as a function of the position of the selector lever 116 before the opening 125 moves into registry with the fixed light-transmitting opening 101. During travel of shutter blades 108, 109 to uncocked positions, the size of the opening 125 remains unchanged.

Figure 2:
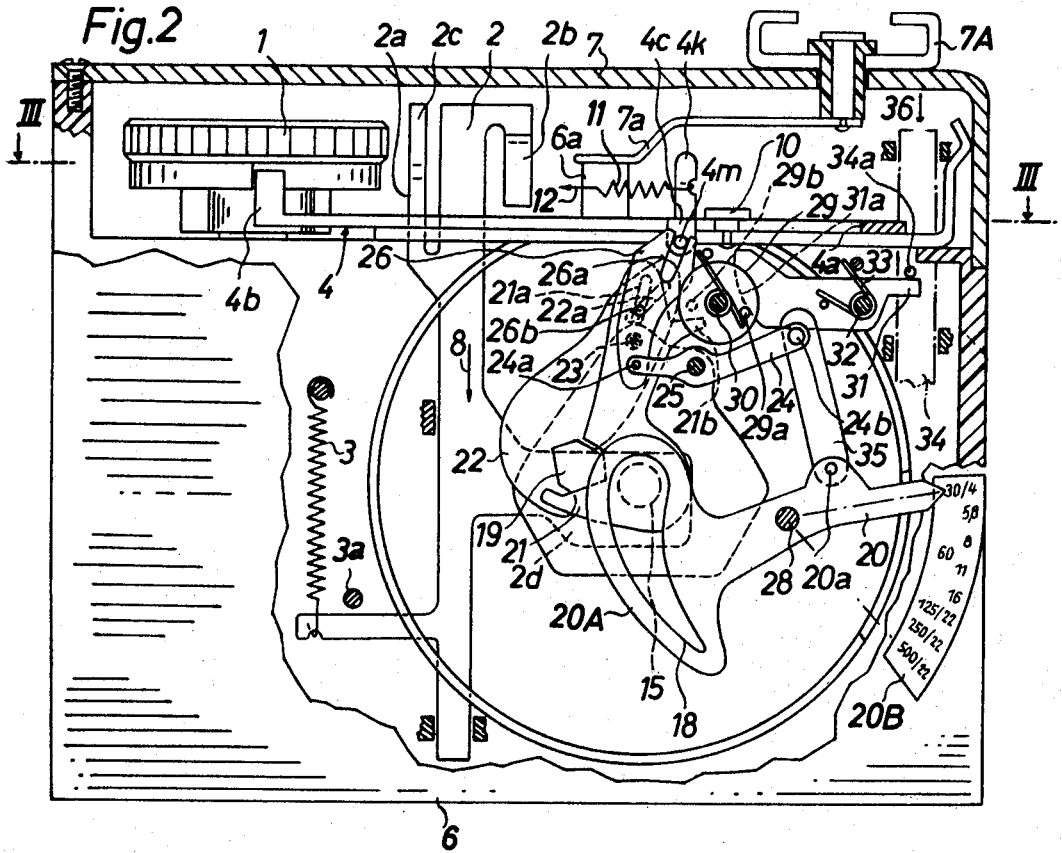
FIG. 2 is a partly elevational and partly vertical sectional view of a camera which includes a modified shutter.
Figure 3:
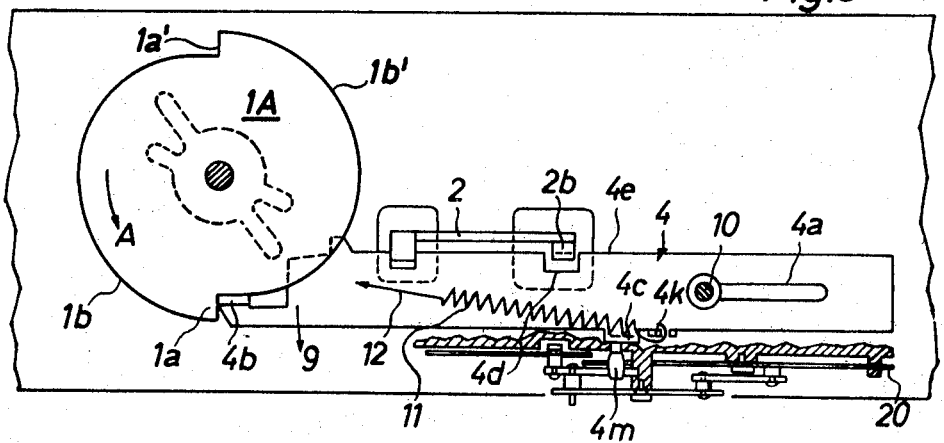
FIG. 3 is a horizontal sectional view substantially as seen in the direction of arrows from the line III—III of FIG. 2.

FIGS. 2 and 3 illustrate a second camera wherein the operator can manually select the desired exposure time and aperture size by way of a selector lever 20. The shutter of this camera is of the behind-the-lens type and a driving means 4 for moving the shutter blades also serves as a blocking device for preventing double exposure of film frames. This driving and blocking device 4 is operated by the film transporting mechanism. The latter includes an actuating wheel 1 which can be rotated by hand in one direction to advance the film, always by the length of a frame. The trigger is shown at 2, a return spring for the trigger is shown at 3, and the camera housing or body at 6. This body comprises an upper portion 7 which accommodates the blocking device 4.

When the trigger 2 is moved from a starting position (arrow 8), its projection 2b can pass through a cutout 4d in the adjoining rear edge face 4e of the blocking device 4, provided that an unexposed film frame is in registry with the objective lens. As the projection 2b passes through the cutout 4d, a cam 2a on the trigger 2 engages the rear edge face 4e of the blocking device 4 and pivots the latter about a shaft 10 which is mounted in the body 6. The blocking member 4 then abuts against a front face 2c of the trigger 2. The direction of angular displacement of the member 4 in response to engagement with the cam 2a is indicated in FIG. 3 by arrow 9. The trigger 2 comprises a vane or mask 2d (corresponding to the vane 102a) which moves away form the registry with a fixed light-transmitting opening 15 when the trigger advances in the direction indicated by arrow 8. The opening 15 is provided in a platen of the body 6.

The blocking device 4 comprises a forwardly extending lug 4c which carries a barrel-shaped or spherical post 4m. This post can be riveted or otherwise fixedly secured to the lug 4c. The device 4 further comprises a tooth 4b which is provided at its left-hand end and is moved away from engagement with a complimentary tooth 1a on a disk-shaped cam 1A (which is turnable by the actuating wheel 1) when the device 4 pivots in the direction indicated by arrow 9. Such pivotal movement of the blocking device 4 also moves its rear edge face 4e away from the projection 2b on the trigger 2 so that the device 4 can follow the bias of a helical spring 11 and moves in the direction indicated by arrow 12 whereby its tooth 4b slides past the tooth 1a. The shaft 10 is received in an elongated slot 4a of the blocking device 4 so that it does not prevent lengthwise displacement of this device when the tooth 4b is free to bypass the tooth 1a. The length of the slot 4a determines the extent of lengthwise displacement of the blocking device 4 under the action of the spring 11. While the device 4 moves in the direction indicated by arrow 11, its rear edge face 4e slides along the front face 2c of the trigger 2. The lug 4c entrains the post 4m and the latter pivots two shutter blades 21, 22 which define an adjustable opening 19. This opening moves past the aforementioned fixed light-transmitting opening 15 whereby the size of the opening 19 and the speed at which the blocking device 4 moves under the action of the spring 11 determine the length of exposure time.

The blocking device 4 comprises an upwardly extending projection or lug 4k which is connected to one end of the spring 11 and engages an elastic electric contact 7a when the device 4 moves in the direction indicated by arrow 11. The contact 7a is insulated from the body 6 and constitutes one element of a synchronizing switch which can complete the circuit of a flashbulb or an electronic flash when the flash unit is attached to an accessory shoe 7A on the upper portion 7 of the body 6. The free end of the contact 7a normally abuts against an insulating block 6a preferably also serves as a means for holding the contact 7a against lateral movement. The other end of the contact 7a extends into the space within the shoe 7A and is engaged by a complementary contact of the flash unit when such unit is attached to the camera body.

The projection 4k is the other contact of the synchronizing switch and engages the contact 7a when the opening 19 travels past the opening 15 so that the flash unit furnishes artificial light which passes through the shutter and reaches an unexposed film frame.

When the trigger 2 is released, it returns to starting position under the action of the spring 3. Such starting position is determined by a fixed stop 3a. The vane or mask 2d then returns into registry with the fixed opening 15. As the trigger 2 moves toward starting position, its cam 2a slides along the rear edge face 4e whereby the spring 11 (see the direction indicated by arrow 12) pivots the blocking device 4 in a clockwise direction, as viewed in FIG. 3, until the tooth 4b reaches and abuts against the convex face 1b of the cam 1A.

The cam 1A is held against rotation in a clockwise direction (as viewed in FIG. 3) by a ratchet and pawl mechanism or the like. When the cam 1A is thereupon rotated by the actuating wheel 1 to turn in a counterclockwise direction (arrow A in FIG. 3), the tooth 4b slides along the cam face 1b and ultimately engages the tooth 1a'. The tooth 1a' then pushes the blocking device 4 against the opposition of the spring 11 whereby the slot 4a travels along the shaft 10 and returns to the position shown in FIG. 3 This arrests the blocking device 4 and the latter arrests the wheel 1 in an angular position in which the wheel has completed the transport of film by the length of a frame. Thus, the device 4 automatically prevents excessive advance of the film and it also prevents double exposure of the same frame because the trigger 2 can be depressed (arrow 8) only when its projection 2b registers with the cutout 4d, i.e., when the device 4 reassumes the position shown in FIG. 3. However, the device 4 can return to such position only when the wheel 1 is actuated subsequent to depression of the trigger 2. When the tooth 4b of the blocking device 4 abuts against the cam face 1b or against the other cam face 1b', the cutout 4d is registry with the projection 2b, i.e., downward movement of such projection is prevented by the rear edge face 4e of the blocking device, and such situation prevails until after the wheel 1 is rotated to advance the film by the length of a frame subsequent to completion of an exposure. In the camera of FIGS. 2 and 3, the wheel 1 must rotate the cam 1A through an angle of 180° in order to return the blocking device 4 to operative position and to advance the film by the length of a frame. However, the film-transporting mechanism can be designed to advance the film by the length of a frame in response to a smaller or larger angular displacement of the wheel 1. Furthermore, this wheel can be replaced by a lever or by other suitable actuating means.

The selection of exposure values is carried out as follows: The blades 21, 22 can turn on a common fixed pivot pin 23. An adjusting lever 24 is turnable on a pivot pin 25 and is coupled to an adjusting link or carrier 26 by a pivot pin 24a. The adjusting link 26 has an open slot 26a for the aforementioned post 4m which corresponds to the post 111 of FIG. 1. The adjusting link 26 is further provided with a rocking pin 26b which extends into elongated slots 21a, 22a respectively provided in the shutter blades 21, 22. The selector lever 20 is pivotable on a fixed pin 28. This selector lever comprises an arm 20A which constitutes a simple diaphragm and is provided with a substantially horn-shaped aperture 18. A time-delay mass 29 is rotatable on a fixed shaft 30 and carries an eccentric follower 29a biased by one end of a torsion spring which urges it against a cam face 3a provided on a motion transmitting lever 31. The latter is turnable on a fixed pivot pin 32 and is biased by a torsion spring 33 which urges one of its arms against a stud 34a on a vertically reciprocable motion transmitting slide 34 or against a pin 24b on the right-hand arm of the adjusting lever 24. The slide 6 is moved downwardly (arrow 36) in response to attachment of a flash unit to the accessory shoe 7A.

When the blocking device 4 moves in the direction indicated by arrow 12, the post 4m pivots the adjusting link 26 in a counterclockwise direction, as viewed in FIG. 2, i.e., the link 26 pivots on the pin 24a and its rocking pin 26a causes the blades 21, 22 to turn on the pivot pin 23 in the same direction (counterclockwise) and to thus move the opening 19 past the fixed light-transmitting opening 15. As explained above, the vane or mask 2d is then registry with the fixed opening 15 so that scene light can reach an unexposed film frame by way of the diaphragm aperture 18, opening 15 and opening 19. In order to furnish a longer exposure time, a delaying pin 29b on the mass 29 is moved into the path of an elastic projection or tongue 21b on the shutter blade 21. This causes the blade 21 to temporarily lag behind the blade 22 during movement of blocking device 4 in the direction indicated by arrow 12 until the tongue 21b effects such angular displacement of the mass 29 that it can bypass the stud 29b.

FIG. 2 illustrates the aforementioned slide 34 in operative (lower end position), i.e., it is assumed that the flash unit is attached to the shoe 7A and that the slide 34 has been displaced in the direction indicated by arrow 36. A strong return spring (not shown) normally holds the slide 34 in its upper end position. In its illustrated lower and position, the slide 34 maintains its stud 34a in engagement with the motion-transmitting lever 31 in a position corresponding to an exposure time of one-thirtieth second which is often preferred for making exposures with artificial illumination of the subject. If the selector lever 20 is pivoted in a clockwise direction, the effective size of the aperture 18 changes because the arm 20A is caused to move relative to the fixed light-transmitting opening 15. Also, the exposure time is shortened because a clockwise angular displacement of the selector lever 20 results in downward movement of a link 35 which is coupled to the levers 20 and 24 whereby the latter turns in a clockwise direction and moves the adjusting link 26 upwardly so that the rocking pin 26b changes the angular position of the blade 22 in a sense to reduce the size of the opening 19. One arm of the selector lever 20 constitutes an index or pointer which travels along a fixed scale 20B which is graduated to indicate various exposure times and aperture sizes.

It is clear that the selector lever 20 can be pivoted by the focusing means (not shown) so that the effective size of the diaphragm aperture 18 is changed automatically as a function of the distance between the camera and the subject when the exposure is made with artificial illumination of the subject.

If the flash unit is detached from the shoe 7A, the slide 34 moves upwardly (counter to the direction indicated by arrow 36) and the stud 34a also moves upwardly so that the spring 33 is free to pivot the motion transmitting lever 31 in a counterclockwise direction and the cam face 31a changes the angular position of the mass 29 so that the pin 29b moves away from the path of the tongue 21b when the selector lever 20 leaves the position shown in FIG. 2. The camera is then set for operation in daylight. The motion-transmitting lever 31 comes to a halt when it engages the pin 24b. If the selector lever 20 is thereupon pivoted in a clockwise direction, the adjusting link 26 moves upwardly so that the slot 26a travels along the post 4m and the rocking pin 26b changes the angular position of the shutter blade 22 with reference to the shutter blade 21 to reduce the size of the opening 19. This shortens the exposure time. Of course, the selector lever 20 also moves the arm 20A with reference to the fixed opening 15 so that the effective size of the aperture 18 is adjusted as a function of the selected exposure time. The scale 20B indicates various combinations of exposure time and aperture size which can be achieved with the camera of FIG. 2. It is clear that the selector lever 20 can be coupled with an exposure meter so that the selection of exposure time and of the corresponding aperture size can take place automatically as a function of scene brightness.

Figure 4:
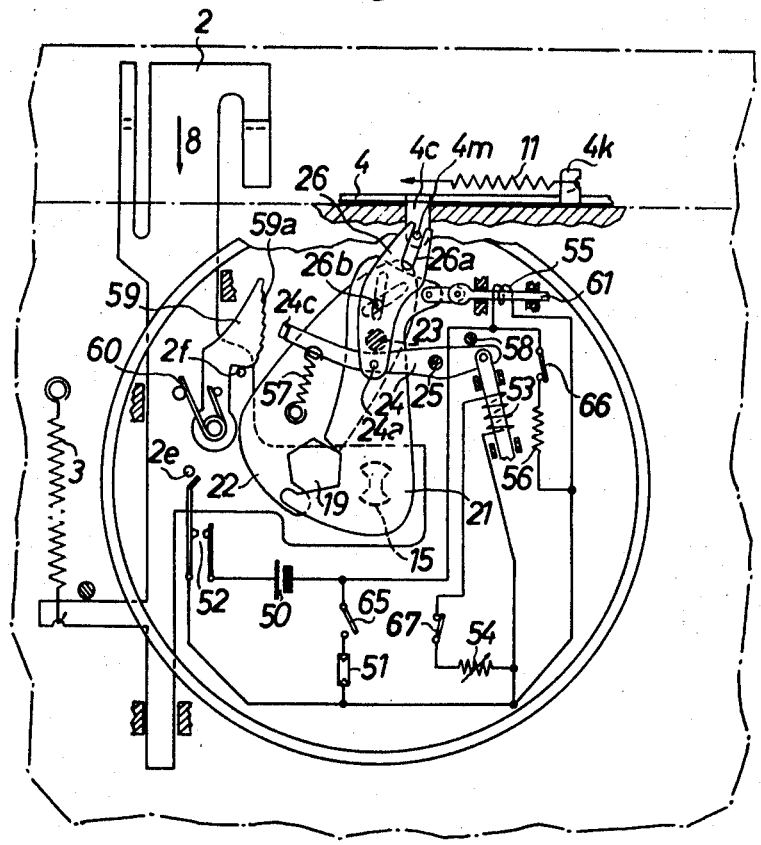
FIG. 4 is a fragmentary vertical sectional view of a camera which includes a third shutter.

FIG. 4 illustrates a modified camera wherein the mechanical components are similar to those shown in FIG. 2 and are denoted by similar reference characters. The camera further comprises an electric circuitry which includes a battery 50 or another suitable energy source, a photoelectric resistor 51, a normally open switch 52, a variable resistor 54, a first electromagnet 53, a second electromagnet 55, and a fixed resistor 56. The armature of the electromagnet 53 is a functional equivalent of the selector lever 20 or 116. In FIG. 4, the circuit is in a condition in which the camera is ready for automatic operation in daylight. When the trigger 2 is moved in the direction indicated by arrow 8, a trip 2e on the trigger closes the switch 52 to complete the circuit and to energize the electromagnet 53. The extent of energization of the electromagnet 53 is a function of the resistance of the variable resistor 54 which is adjustable by the range finder (not shown). The armature of the electromagnet 53 pivots the adjusting lever 24 to an extent which is a function of the resistance of the resistor 54 whereby the adjusting lever 24 pivots against the opposition of a spring 57 and away from a stop 58. The pin 24a moves the adjusting link 26 and the rocking pin 26b changes the size of the movable opening 19 by pivoting the shutter blade 21 with reference to the blade 22 and/or vice versa.

The electromagnet 55 is energized by the current flowing through the fixed resistor 56 and develops an electric field which opposes pivotal movements of blades 21, 22 (see the armature 61) to thereby furnish a constant exposure time which is desirable for making exposures with artificial illumination of the subject. As the operator continues to depress the trigger 2, a pin 2f of the trigger releases a locking lever 59 which is biased by a torsion spring 60 so that it remains in abutment with the pin 2f until the serrated surface 59a of the lever 59 engages the tip 24c of the lever 24. The trigger 2 thereupon releases the blocking device 4 so that the latter is free to move under the action of the spring 11. The post 4m rocks the adjusting link 26 and pivots the blades 21, 22 about the pin 23 so that the opening 19 travels past the fixed light-transmitting opening 15.

Figure 5:
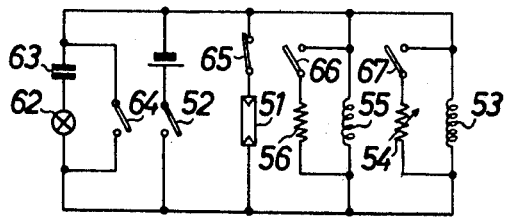
FIG. 5 is a diagram of the electric circuitry in the camera of FIG. 4.

FIG. 5 illustrates the circuit of FIG. 4 and a flash circuit which includes a flashbulb 62, a capacitor 63 and a synchronizing switch 64. Three additional switches 65, 66, 67 are provided and they respectively serve to disconnect the photosensitive receiver 51, the fixed resistor 56 and the variable resistor 54. When the camera is set to operate with artificial illumination of the subject, the switch 65 is open to disconnect the photosensitive resistor 51. The switches 66, 67 are closed. When the flash unit is detached from the camera (or is otherwise inactivated), a rod, a slide or a like motion-transmitting device (not shown) closes the switch 65 and opens the switches 66, 67 so that the circuit then assumes the condition shown in FIG. 5. The photosensitive resistor 51 then determines the extent of energization of the electromagnets 53, 55 so that the exposure time and the aperture size are selected as a function of scene brightness. The switches 65–67 can form part of a printed circuit.

All embodiments of my invention share the common feature that the size of the movable opening 19 or 125 can be selected before this opening moves past the fixed light-transmitting opening 15 or 101. The exposure time is determined by the size of the movable opening, i.e., by the dimensions of the opening 19 or 125 as considered in the direction of travel of shutter blades 21, 22 or 108, 109 to move the opening 19 or 125 toward, into and away from registry with the fixed light-transmitting opening 15 or 101. The delay device 29 shown in FIG. 2 can alter the exposure time independently of the preselected size of the opening 19. The electromagnet 55 is a functional equivalent of the device 29.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. In a photographic apparatus, a combination comprising means defining a first light-transmitting opening; a plurality of shutter blade means defining a movable second opening, said blade means normally overlaying said first opening and at least one of said blade means being movable with reference to the other blade means to change the size of said second opening; adjusting means operative to move said one blade means to select a second opening of desired size, said adjusting means comprising an adjusting member for moving said one blade means; adjustable selector means for arresting said adjusting member in one of a plurality of positions each of which corresponds to a different size of said second opening; means for adjusting said selector means; and drive means operative to move the blade means so that the second opening selected by said adjusting means travels toward, in registry with and beyond the first opening whereby the duration of that interval during which the selected second opening registers with said first opening determines the length of exposure time.

2. A combination as defined in claim 1, wherein said blade means comprises two blades pivotable by said drive means about a common axis and said adjusting member comprises pivoting means for pivoting at least one of said blades with reference to the other blade.

3. A combination as defined in claim 2, wherein said blades are provided with mutually inclined slots and said pivoting member comprises a pin exceeding into and movable lengthwise of said slots.

4. A combination as defined in claim 3, wherein said adjusting means further comprises a carrier connected with said pin and moving means for moving said carrier to thereby move said pin in said slots.

5. A combination as defined in claim 4, wherein said carrier is a link and said moving means comprises a lever having an arm articulately coupled to said link.

6. A combination as defined in claim 1, further comprising trigger means for effecting operation of said adjusting means prior to operation of said drive means.

7. A combination as defined in claim 1, wherein the means for adjusting said selector means comprises electromagnet means.

8. A combination as defined in claim 7, wherein the means for adjusting said selector means comprises exposure control means so that the position of said selector means is a function of scene brightness.

9. A combination as defined in claim 7, further comprising a source of artificial illumination having operative and inoperative positions and means for energizing said source to thereby select a predetermined size for said second opening.

10. In a photographic apparatus, a combination comprising means defining a first light-transmitting opening; two shutter blades pivotable about a common axis and defining a movable second opening, said blades normally overlying said first opening and at least one of said blades being movable with reference to the other blade to change the size of said second opening, said blades being provided with mutually inclined slots; adjusting means having pivoting means for pivoting at least one of said blades with reference to the other blade to thus select a second opening of desired size, said pivoting means comprising a pin extending into and movable lengthwise of said slots and said adjusting means further comprising a carrier connected with said pin and moving means for moving said carrier to thereby move said pin in said slots; and drive means operative to pivot said blades about said common axis so that the second opening selected by said adjusting means travels toward, in registry with and beyond said first opening whereby the duration of that interval during which the selected second opening registers with said first opening determines the length of exposure time, said drive means comprising pivoting means for pivoting said blades about said common axis by way of said carrier and said pin.

11. A combination as defined in claim 10, wherein said carrier has a slot and said pivoting means comprises a post extending into said last-mentioned slot and means for moving said post to thereby move said post, said carrier and said pin whereby the pin pivots said blades about said common axis.

12. A combination as defined in claim 11, wherein the slot of said carrier moves with reference to said post in response to movement of said pin with reference to the slots of said blades.

13. A combination as defined in claim 12, wherein said post moves relative to the slot of said carrier during simultaneous pivotal movement of said blades about said common axis.

14. In a photographic apparatus, a combination comprising means defining a first light-transmitting opening; a plurality of shutter blade means defining a movable second opening, said blade means normally overlying said first opening and at least one of said blade means being movable with reference to the other blade means to change the size of said second opening; adjusting means operative to move said one blade means to select a second opening of desired size, said adjusting means comprising an adjusting member for moving said one blade means and adjustable stop means for arresting said adjusting member in a position corresponding to the desired size of said second opening; drive means operative to move the blade means so that the second opening selected by said adjusting means travels toward, in registry with and beyond the first opening whereby the duration of that interval during which the selected second opening registers with said first opening determines the length of exposure time; trigger means for effecting operation of said adjusting means prior to operation of said drive means; and retaining means movable between a first position in which said retaining means prevents operation of said drive means and a second position, said trigger means comprising a portion arranged to move said retaining means to said second position subsequent to operation of said adjusting means.

15. A combination as defined in claim 14, wherein said trigger means comprises a first lever and said retaining means comprises a second lever, said first lever having a face which pivots the second lever to second position in response to movement of said first lever from a starting position.

16. In a photographic apparatus, a combination comprising means defining a first light-transmitting opening; a plurality of shutter blade means defining a movable second opening, said blade means normally overlying said first opening and at least one of said blade means being movable with reference to the other blade means to change the size of said second opening; adjusting means operative to move said one blade means to select a second opening of desired size; drive means operative to move the blade means so that the second opening selected by said adjusting means travels toward, in registry with and beyond the first opening whereby the duration of that interval during which the selected second opening registers with said first opening determines the length of exposure time, said drive means comprising a driving member which is movable from a cocked position to thereby move said second opening toward, in registry with and beyond said first opening; and trigger means for effecting operation of said adjusting means prior to operation of said drive means, said trigger means being movable to and from a starting position and comprising cocking means for moving said driving member to said cocked position in response to movement of said trigger means to said starting position.

17. A combination as defined in claim 16, wherein said trigger means is a lever and said cocking means constitutes an arm of said lever, said driving member comprising a post which moves said blade means and said arm being arranged to engage and to move said post to thereby move said driving member to cocked position.

18. In a photographic apparatus, a combination comprising means defining a first light-transmitting opening; a plurality of shutter blade means defining a movable second opening, said blade means normally overlying said first opening and at least one of said blade means being movable with reference to the other blade means to change the size of said second opening; adjusting means operative to move said one blade means to select a second opening of desired size; adjustable selector means for controlling said adjusting means so that said adjusting means selects for said second opening a size which is a function of adjustment of said selector means; diaphragm means operatively connected with and adjustable by said selector means; and drive means operative to move the blade means so that the second opening selected by said adjusting means travels toward, in registry with and beyond said first opening whereby the duration of that interval during which the selected second opening registers with said first opening determines the length of exposure time.

19. A combination as defined in claim 18, wherein said diaphragm means is provided with a substantially horn-shaped aperture.

20. A combination as defined in claim 18, wherein said selector means is arranged to adjust said diaphragm means as a function of the selected exposure time.